US008656222B2

(12) United States Patent
Chow et al.

(10) Patent No.: US 8,656,222 B2
(45) Date of Patent: Feb. 18, 2014

(54) METHOD AND SYSTEM FOR RECORDING A SELECTED COMPUTER PROCESS FOR SUBSEQUENT REPLAY

(75) Inventors: James Chow, San Jose, CA (US); Tal Garfinkel, Palo Alto, CA (US); Dominic Lucchetti, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 52 days.

(21) Appl. No.: 12/512,288

(22) Filed: Jul. 30, 2009

(65) Prior Publication Data

US 2011/0029821 A1 Feb. 3, 2011

(51) Int. Cl.
*G06F 11/00* (2006.01)

(52) U.S. Cl.
USPC ................................. 714/38.1; 717/124

(58) Field of Classification Search
USPC .................... 714/38.1, 45; 717/124, 127
See application file for complete search history.

(56) References Cited

U.S. PATENT DOCUMENTS

| | | | | |
|---|---|---|---|---|
| 5,870,607 | A * | 2/1999 | Netzer | 717/127 |
| 6,832,367 | B1 * | 12/2004 | Choi et al. | 717/130 |
| 7,100,027 | B1 * | 8/2006 | Padwekar | 712/227 |
| 7,506,318 | B1 * | 3/2009 | Lindo et al. | 717/130 |
| 7,512,769 | B1 * | 3/2009 | Lowell et al. | 711/203 |
| 7,620,938 | B2 * | 11/2009 | Edwards et al. | 717/124 |
| 8,099,391 | B1 * | 1/2012 | Monckton | 707/647 |
| 2010/0005464 | A1 * | 1/2010 | Malyugin et al. | 718/1 |
| 2010/0251031 | A1 * | 9/2010 | Nieh et al. | 714/45 |

OTHER PUBLICATIONS

Narayanasamy et al. "BugNet: Recording Application-Level Execution for Deterministic Replay Debugging." Micro, IEEE. Jan.-Feb. 2006.*
Russinovich et al. "Operating System Support for Replay of Concurrent Non-Deterministic Shared Memory Applications," in Bulletin of the Technical Committee on Operating Systems and Applications Environments (TCOS), IEEE Computer Society, Winter 1995, vol. 7, No. 4, pp. 15-19.*
Nieh et al. specification of U.S. Appl. No. 61/162,873.*
Miguel Castro et al., "Better bug reporting with better privacy", Proceedings of the 2008 International Conference on Architectural Support for Programming Languages and Operating Systems (ASPLOS), Mar. 2008, pp. 319-328.
U.S. Appl. No. 12/057,282, filed Mar. 27, 2008, entitled "Using Branch Instruction Counts to Facilitate Replay of Virtual Machine Instruction Execution", by Venkitachalam, et al., 43 pages.

* cited by examiner

*Primary Examiner* — Philip Guyton

(57) ABSTRACT

The execution behavior of a selected application is recorded for subsequent replay. During recording, only those portions of memory that are accessed by the selected application are stored. As a result, the amount of data that is stored during the recording session is reduced and data that is not necessary for replaying the selected application, which may include possible sensitive and personal information, are not stored.

20 Claims, 5 Drawing Sheets

METHOD AND SYSTEM FOR RECORDING A SELECTED COMPUTER PROCESS FOR SUBSEQUENT REPLAY

BACKGROUND OF THE INVENTION

Some virtual machine platforms provide the capability to record the execution behavior of an instantiated virtual machine for replay at a later point in time. The recording is done by taking a snapshot of the complete state of the virtual machine at a certain point in time. The complete state of the virtual machine includes its entire memory, which can be multiple gigabytes in size, and its entire device state, including its hard disk drive, which can be hundreds of gigabytes in size.

One application of record and replay is debugging. The replay of a recorded session replicates any errors that arose during the original execution of an application. With this feature, an application end user can provide to the application vendor a recording that includes errors during the application's execution, and the application vendor can, in turn, replay the errors for debugging. However, the size of the recording's snapshot makes its storing and transporting difficult. Furthermore, the snapshot exposes to a recipient (in this case, the application vendor) all the data stored in the virtual machine's hard disk drive, including any sensitive database files and personal information. The security and privacy issues relating to the contents stored in a snapshot limits the ability to share such recordings between unrelated entities.

SUMMARY OF THE INVENTION

One or more embodiments of the invention provide methods and systems for recording a selected computer process for subsequent replay. When an application is selected for recordation, only those portions of memory that are accessed by the application during the recording session are stored. As a result, the amount of data that is stored during the recording session is reduced and data that is not necessary for replaying the selected application, which may include possible sensitive and personal information, are not stored.

One embodiment of the invention provides a method for recording an application process for replay. The method comprises monitoring switching of execution control between the application process and an operating system and logging a difference between two states at different points of switching.

Another embodiment of the invention provides a method for replaying such an application process. The method comprises loading an initial snapshot of the application process, and replaying the application process, wherein during the replaying, execution control is obtained in accordance with entries in a log file, and an address space of the application process is updated using the log file upon obtaining execution control.

DETAILED DESCRIPTION

A. Virtualization Platform Architecture

Figure 1:
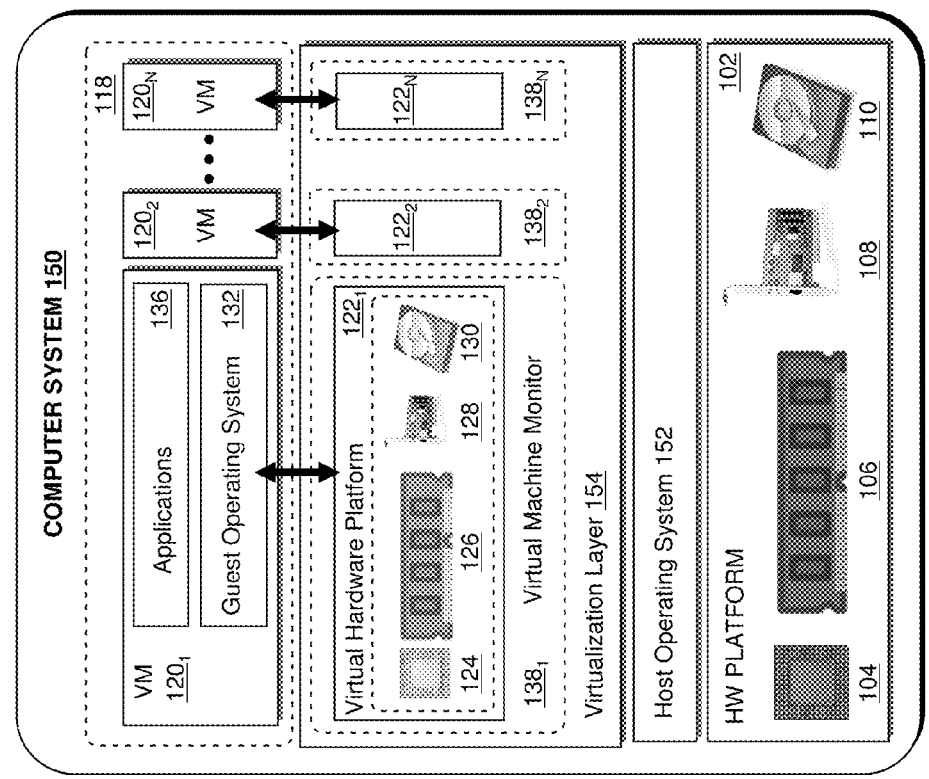
FIG. 1 is a schematic diagram of computer systems implementing a virtualized computer platform.
Figure 1:
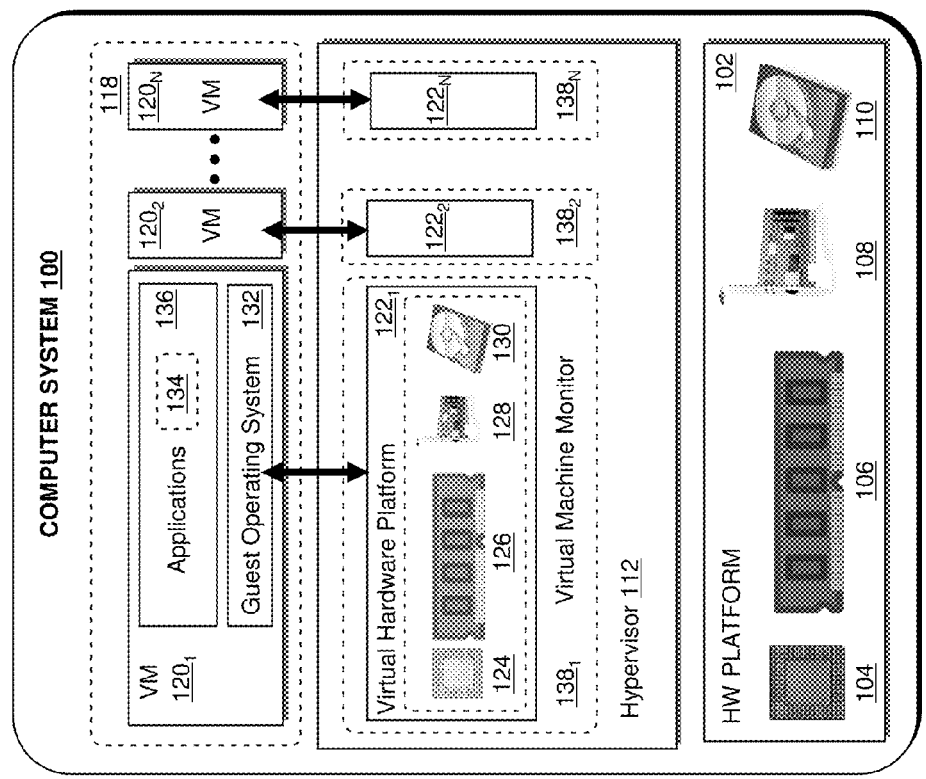

FIG. 1 depicts a block diagram of a virtualized computer system 100 in which one or more embodiments of the invention may be practiced. A computer system 100 may be constructed on a desktop, laptop or server grade hardware platform 102 such as the x86 architecture platform. Such a hardware platform 102 may include a CPU 104, RAM (Random Access Memory) 106, NIC (Network Interface Card) 108, hard drive 110 and other I/O devices such as a mouse and keyboard (not shown in FIG. 1). A virtualization software layer 112 (also referred to as a hypervisor) is installed on top of hardware platform 102 and supports a virtual machine execution space 118 within which multiple VMs $120_1$-$120_N$ may be concurrently instantiated and executed. Hypervisor 112 maps the physical resources of hardware platform 102 (e.g., CPU 104, RAM 106, network card 108, hard drive 110, mouse, keyboard, etc.) to the "virtual" resources of each virtual machine $120_1$ to $120_N$, such that each virtual machine $120_1$ to $120_N$ has its own virtual hardware platform $122_1$ to $122_N$ with its own emulated hardware such as CPU 124, RAM 126, NIC 128, hard drive 130 and other emulated I/O devices in VM $120_1$. For example, virtual hardware platform $122_1$ may function as the equivalent of a standard x86 hardware architecture such that any x86 supported operating system, e.g., Microsoft Windows, Linux, Solaris x86, NetWare, FreeBSD, etc., may be installed as a guest operating system 132 in order to execute an application 134 in an application layer 136 for an instantiated virtual machine, e.g., VM $120_1$. Virtual hardware platforms $122_1$ to $122_N$ may be considered to be part of hypervisor's 112 virtual machine monitors (VMM) $138_1$-$138_N$, which implement the virtual system support needed to coordinate operation between hypervisor 112 and corresponding virtual machines $120_1$ to $120_N$. One example of a hypervisor 112 that may be used in an embodiment of the invention is VMkernel™ which is implemented in VMware's ESX® virtualization product, available from VMware™ Inc. of Palo Alto, Calif.

A computer system 150 is an alternative system in which one or more embodiments of the invention may be practiced. Rather than having a hypervisor 112 between hardware platform 102 and virtual machine execution space 118, computer system 150 has a virtualization software layer 154 that runs on top of a host operating system 152 such as Microsoft Windows, Linux, Solariss x86, NetWare, FreeBSD, etc. that runs on top of hardware platform 102. Virtualization software layer 154 performs similar functions as hypervisor 112 except that it communicates with host operating system 152 rather than directly with hardware platform 102. An example of software implementing virtualization layer 154 for a desktop or laptop hardware platform 102 is VMware Workstation 6™, which is also available from VMware. It should be recognized that the various terms, layers and categorizations used to describe the virtualization components in FIG. 1 may be referred to differently without departing from their functionality or the spirit or scope of the invention. For example, virtual hardware platforms $122_1$ to $122_N$ may also be considered to be separate from VMMs $138_1$ to $138_N$ and VMMs $138_1$ to $138_N$ may be considered to be separate from hypervisor 112 or virtualization layer 154.

B. Application Virtual Address Space Management

Virtualization software, or, more broadly, virtualization logic (which may also include virtualization functionality implemented in hardware or firmware), may support the operation of a virtual machine so that it operates substantially the same as a physical computer, enabling software to operate substantially the same within the virtual machine as it would operate directly on a physical computer. For simplicity, for virtualized computer systems, such as those illustrated in FIG. 1, the following description focuses on the operation of the virtual hardware platform $122_1$ and the software executing within the virtual machine $120_1$, while ignoring the operation of the underlying virtualization software or logic that enables the virtual hardware platform $122_1$ and virtual machine $120_1$ to operate in this manner.

Figure 2:
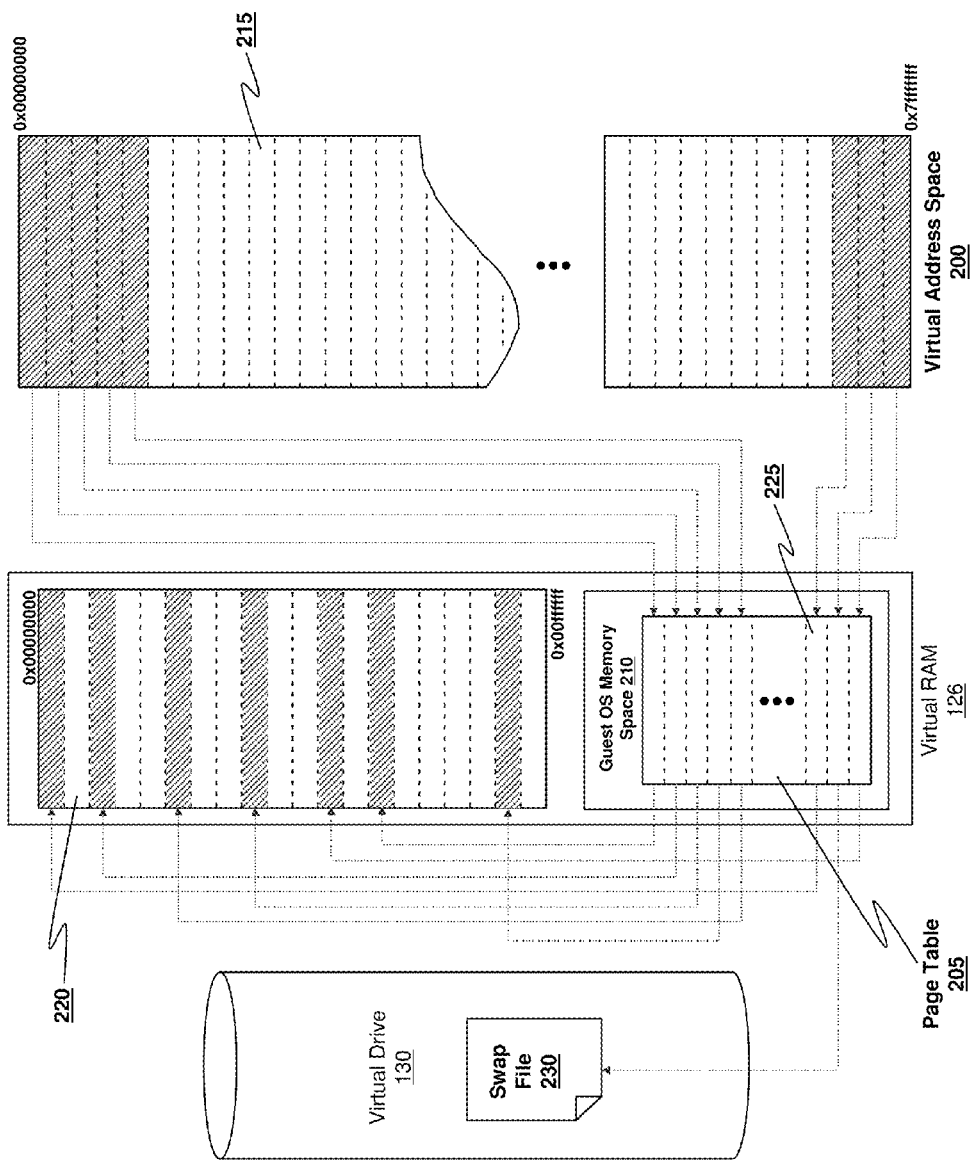
FIG. 2 is a diagram depicting the translation of addresses in a virtual address space to corresponding physical addresses.

When application 134 is launched in virtual machine $120_1$, guest operating system 132 communicates with virtual CPU 124 to allocate a virtual address space 200 (See FIG. 2) to application 134 and loads the instructions (i.e., code) that execute application 134 into a portion of virtual address space 200. This instance of application 134 is known as a "process" of application 134. Virtual address space 200 defines the metes and bounds within which application 134 operates—in addition to housing application's 134 code, all data and state information that may be generated and/or utilized during the execution of application 134 is also stored in or accessed through virtual address space 200. FIG. 2 is a diagram depicting the translation of addresses in virtual address space 200 to corresponding physical addresses in virtual RAM 126.

A page table 205 maps the virtual address space 200 into a portion of virtual RAM 126 that is controlled by guest operating system 132. The page table 205 is stored in a guest operating system memory space 210. Virtual address space 200 is split up into contiguous chunks, known as pages (see, e.g., 215). Similarly, virtual RAM 126 is also split up into chunks of the same size, known as page frames (see, e.g., 220). For example, if virtual address space represents 4 GBs of contiguous addresses and virtual RAM 126 contains 2 GBs of memory, both a page and a page frame may comprise 4 MBs of memory addresses. Page table 205 may contain an entry 225 for each page of virtual address space 200. Each entry contains a mapping to a page frame in virtual RAM 126. Memory pages in the virtual address space 200 that are not currently loaded into virtual RAM 126 are stored in secondary memory such as virtual hard drive 130. While the page table entries for such memory pages will indicate that the pages are not loaded into virtual RAM 126, the entry may nonetheless be used to indicate where the corresponding data is stored on the virtual hard drive 130. Each entry may also include additional state information, for example, to determine whether an entry contains a valid mapping, whether the page was recently accessed, and whether the page was recently written (referred to herein as valid bit, reference bit and modify bit, respectively). It should be recognized that the foregoing description of a page table is merely exemplary and that a number of structures may be utilized to implement a page table in embodiments of the invention, including, inverted page tables, hierarchical page tables, and the like.

Upon launch of application 134, guest operating system 132 branches to the location in virtual address space 200 where application's 134 code instructions were loaded in order to begin execution. During execution, application 134 generates addresses within virtual address space 200 for reading data from and writing data to memory. Virtual CPU 124 translates such an address into physical addresses in virtual RAM 126 by determining the virtual address page that contains the address and referencing page table 205 to obtain the mapped physical page in virtual RAM 126. If page table 205 indicates that no physical page in virtual RAM 126 is associated with the virtual address page, virtual CPU 124 generates a "page fault" and generates an interrupt for guest operating system 132. If the page is stored on virtual hard drive 130 in a swap file 230, for example, guest operating system 132 handles the interrupt by extracting the location of the page in virtual hard drive 130 from the page table entry, fetching the page from virtual hard drive 130, copying the fetched page into an available page frame in virtual RAM 126, and updating the entry in page table 205 to include the location of the page frame.

It should be recognized that the foregoing is a simplified description of the implementation of virtual memory spaces. For example, typical virtual memory management systems may also include the use of a combination of additional software and hardware components such as translation lookaside buffers (TLB) and memory management units (MMU) and utilize a variety of page loading techniques, such as demand paging and page replacement policies such as least-recently-used policies. It should also be recognized that additional address translations may be required to translate the "physical" pages of virtual RAM 126 to the true physical pages of RAM 106 in virtualized systems such as 100 and 150. In one embodiment, for example, shadow page tables such as those described in U.S. Pat. No. 7,222,221, which is hereby incorporated by reference, may be utilized to maintain the coherency of data during such address translations on a computer system with a physical RAM that supports virtual RAMs for multiple instantiated virtual machines. Alternative embodiments may further utilize hardware processors that implement special virtualization architectures to assist in such address translations, such as Intel Virtualization Technology or AMD Virtualization. Furthermore, it should be recognized that the foregoing description of virtual memory also applies to traditional non-virtualized computer systems. In such systems, a true hardware CPU and hardware RAM would interact with the operating system to allocate a virtual address space for each application.

C. Recording an Application's Execution Behavior

Figure 3:
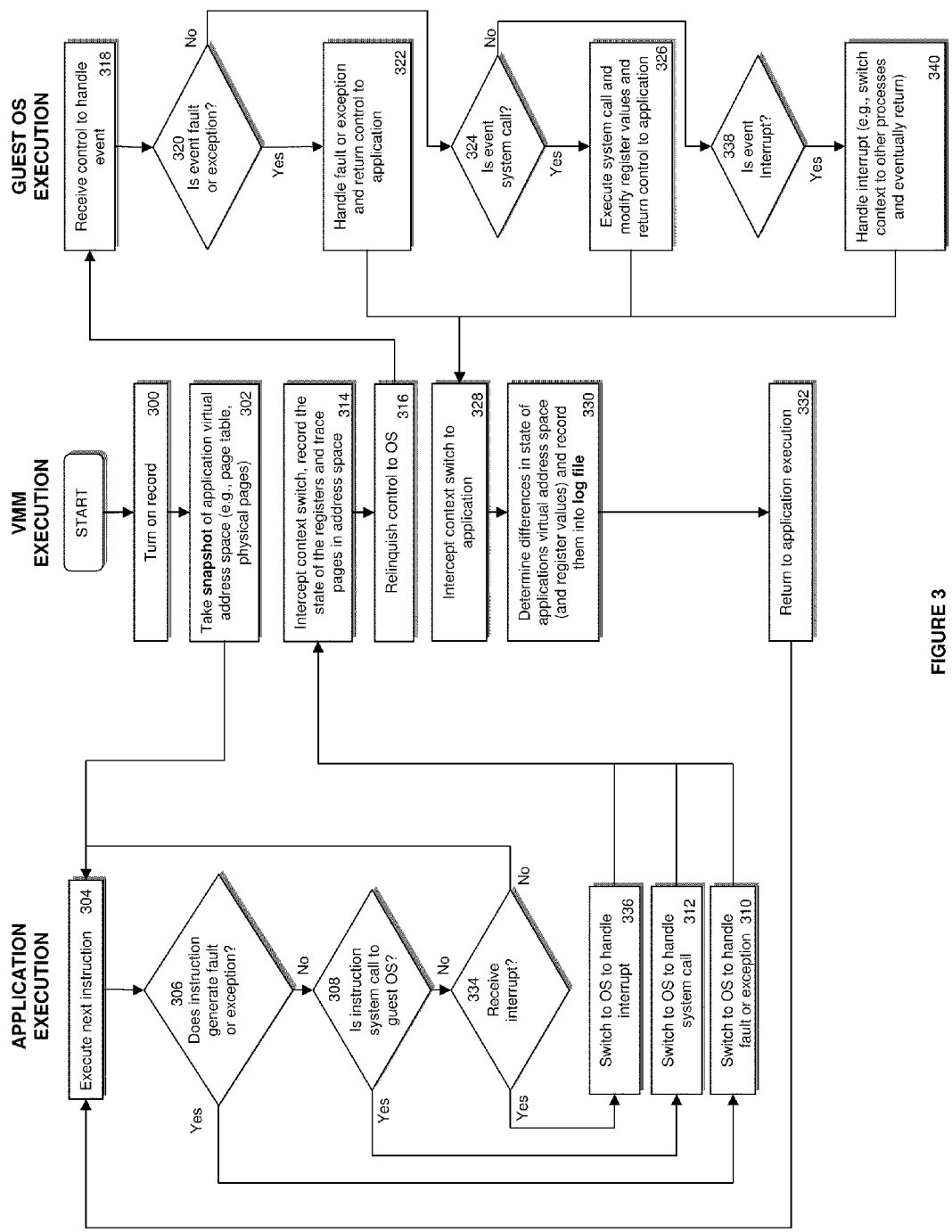
FIG. 3 is a flow for recording the execution behavior of a selected application process for subsequent replay.

FIG. 3 depicts a flow for recording the execution behavior of a selected process of application 134 for subsequent replay. By tracking the changes occurring in virtual address space 200 during execution, VMM $138_1$ can record enough information to recreate the execution behavior of the application process at a later point in time during a replay session.

At step 300, once a process of application 134 has been targeted for recording, VMM $138_1$ enables the recording function and, in step 302, an initial snapshot of the current state of the application is taken and stored. This snapshot may include the state of some or all of the registers, some or all of the application's 134 page table 205, and some or all of the physical page frames of virtual RAM 126 that are accessible from valid entries of page table 205. Once the record function has been enabled, VMM $138_1$ begins to monitor context switches that occur between guest operating system 132 and application 134 during execution of application's 134 code. Such context switches may occur when application 134 generates a fault or exception (e.g., a page fault during a memory read, floating point exceptions, etc.), evokes a system call to guest operating system 132, or receives an interrupt (e.g., synchronous interrupts such as software generated interrupts and asynchronous interrupts such as hardware generated interrupts from clocks, disks, network devices and the like).

In step 304, when application 134 executes an instruction, the instruction may generate a fault or exception in step 306, such as in the case of a page fault during a memory read instruction, if the page including the memory address does not have a corresponding page frame in virtual RAM 126 as indicated by page table 205. Alternatively, the instruction may be a system call into guest operating system 132 as determined in step 308. In the case of either of these events, a context switch from application 134 to guest operating system 132 occurs to handle either the fault or exception in step 310 or the system call in step 312. VMM $138_1$ recognizes the occurrence of the context switch and takes control of the execution flow before guest operating system 132 is able to handle the event. In step 314, VMM $138_1$ records the state of the registers and places a trace on the pages in application's 134 virtual address space to track any subsequent changes that may occur as guest operating system 132 handles the event. In step 316, VMM $138_1$ then relinquishes execution control to guest operating system 132.

In step 318, guest operating system 132 receives control of the execution flow and, in step 320, if the event is a fault or exception, guest operating system 132 handles the fault in step 322. For example, if the event is a page fault, guest operating system 132 either retrieves the page from virtual drive 130 or allocates a new page frame if the page does not yet exist and places such a page frame into the address space of application 134 (or issues an error signal if the address access is illegal). Alternatively, in step 324, if the event is a system call, guest operating system 132 executes the system call in step 326 and modifies the appropriate register values to reflect the return value of the system call. In either the case of a fault/exception or system call, when a context switch is executed to return control back from guest operating system 132 to application 134, in step 328, VMM $138_1$ takes control of the execution flow and, in step 330, determines the changes in application's 134 address space and register values (that were made during the handling of the fault/exception or system call by guest operating system 132) and may record some or all of those changes into a log file. For example, such recorded changes may be a page of data that was added to a page frame in virtual RAM 126 and updated in page table 205 during the handling of a page fault or a new register value in response to a system call. In step 332, VMM $138_1$ returns execution control back to application 134. For example, if the event was a page fault, then when VMM $138_1$ returns control to application 134, application 134 is able to re-execute the memory read instruction with the memory address now accessible in its address space. Alternatively, if the event was a system call, then VMM $138_1$ returns control to application 134 which is able to access the return value of the system call in the appropriate register.

In addition to context switches occurring as a result of page faults or system calls, application 134 may also receive an interrupt during its execution, as in step 334. Such an interrupt may occur, for example, to provide guest operating system 132 an opportunity to handle other processes, which may modify memory that is shared with application 134. In step 336, a content switch occurs to cede control to guest operating system 132 to handle the interrupt. Similar to page faults and system calls, VMM $138_1$ recognizes the occurrence of the context switch and takes control of the execution flow before guest operating system 132 is able to handle the event. As before, in step 314, VMM $138_1$ records the state of the registers and places a trace on the pages in application's 134 virtual address space to track any subsequent changes that may occur after guest operating system 132 handles the event. In step 316, VMM $138_1$ then relinquishes execution control to guest operating system 132, which in step 338, identifies the event as an interrupt and handles it accordingly in step 340. When a context switch is executed to return control back from guest operating system 132 to application 134, in step 328, VMM $138_1$ takes control of the execution flow and, in step 330, determines the changes in application's 134 address space (e.g., as a result of shared memory modifications) and records those changes into a log file. In step 332, VMM $138_1$ cedes control back to application 134, which continues execution.

D. Replaying an Application's Execution Behavior

Figure 4:
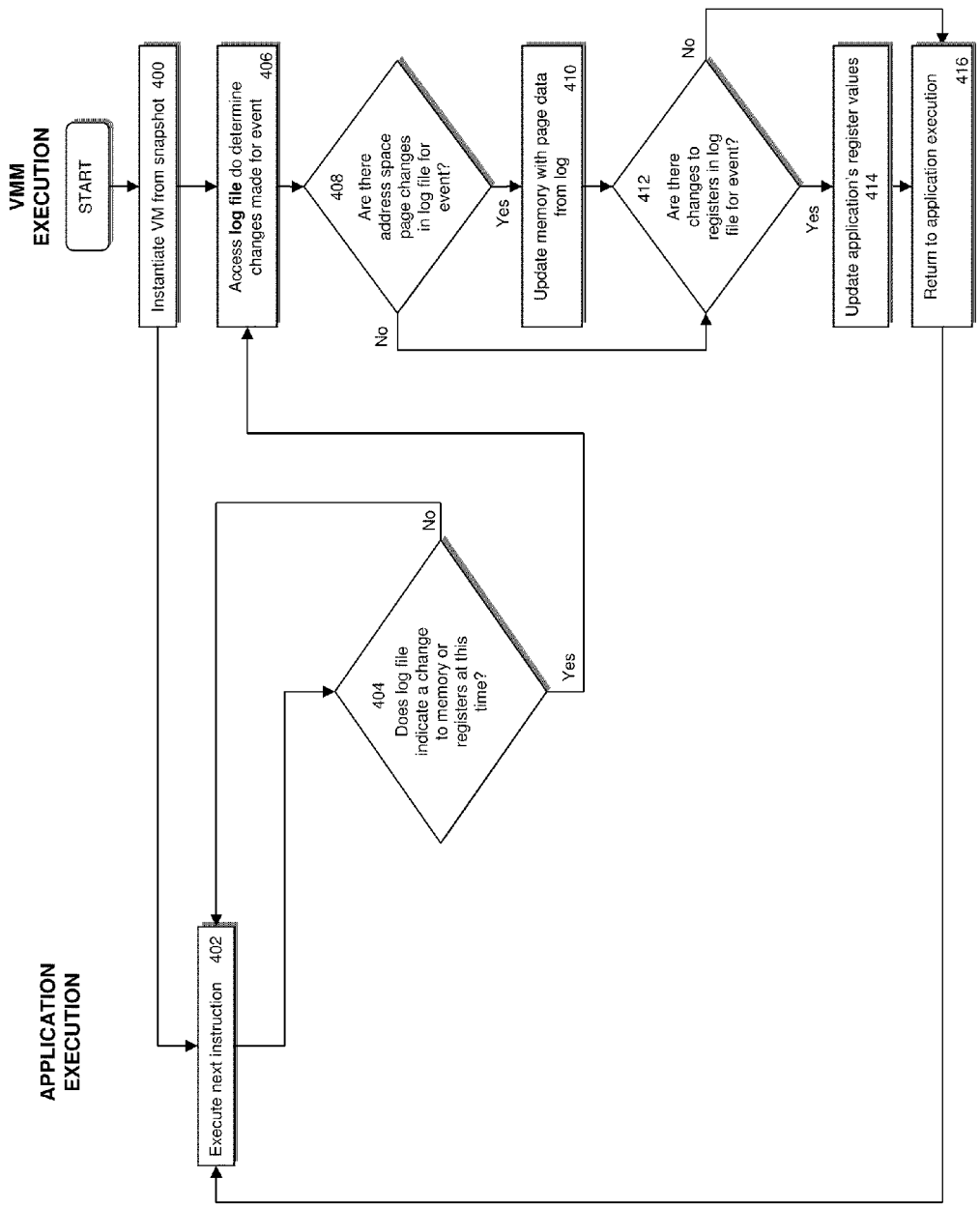
FIG. 4 is a flow for replaying the execution behavior of a selected application process using the recording in FIG. 3.

Once an initial snapshot of the application state and a log file of changes to the application have been made, application's 134 process may be replayed. FIG. 4 depicts a flow for replaying the execution behavior of application 134 through the use of a recording made using the flow depicted in FIG. 3.

In step 400, a replay virtual machine is instantiated from the snapshot taken in step 302. In the embodiment of FIG. 4, the snapshot provides the replay virtual machine a bare framework environment that is only capable of replaying application 134 from the beginning of the recording made in FIG. 3. Application's 134 registers and page table 205 (as they were at the time of recording in step 300), and all the physical pages of virtual RAM 126 that were accessible from valid entries of page table 205 at the recording in step 300 are loaded into the corresponding components of the instantiated replay virtual machine (e.g., virtual RAM and registers). It should be recognized that, depending upon the architecture of virtual CPU 124, additional privileged hardware state may have been stored in the snapshot, including privileged hardware registers and hardware data structures (e.g., segment descriptor tables, etc.). Because they have been excluded from the snapshot, no address spaces of other processes, including guest operating system 132, that may have been running in virtual RAM 126 during the recording and no portions of virtual drive 130 (or any other device state) are loaded into the replay virtual machine After loading the snapshot, the VMM of the replay virtual machine hands control of execution off to a process that has been launched to perform the replay and, in step 402, the instruction code begins to execute. Prior to execution of the instruction, in step 404, the VMM determines whether the log file indicates that a change in the state of the address space and registers of the process had occurred at the time of the instruction's execution during the recording session. As previously discussed in the context of FIG. 3, such a change in the address space and registers of the process may occur upon a synchronous event such as a fault, exception, or system call by the instruction stream itself, or upon an asynchronous event, such as an interrupt. In the embodiment of FIG. 4, because a guest operating system does not exist in the replay environment, if the log file indicates that a change of state had occurred (whether due to a synchronous or asynchronous event), the VMM delivers an asynchronous event to gain control of the execution stream for itself from application 134. It should be recognized that various mechanisms for the timely delivery of asynchronous events to provide execution control to the VMM may be implemented in different embodiments. For example, in one embodiment, the VMM can step through each instruction and assess whether an asynchronous event should be delivered at such instruction (e.g., by consulting the log file). In an alternative embodiment, hardware program counters can be programmed by the VMM to automatically break execution of the instruction stream and pass control to the VMM upon the occurrence of certain events (e.g., after a certain number of instructions are executed, etc.). In yet other embodiments, asynchronous event delivery mechanisms similar to those utilized in current virtual machine record and replay features, such as in VMware Workstation 6, are used.

Once the VMM delivers the asynchronous event and gains control of the instruction stream, then in step 406, it accesses the log file written to in step 330. If in step 408, the VMM confirms that page changes were made as a result of the state changing event (e.g., page fault, interrupt, etc.), the VMM then extracts the page changes relating to the page fault from the log file and adds (or otherwise swaps) the appropriate pages into the virtual RAM and updates page table 205 accordingly in step 410. Similarly, if, in step 412, the VMM confirms that the state changing event (e.g., system call, etc.) modified the application's registers, the VMM extracts the register modifications made as a result of the system call from the log file and changes the application's register values in step 414. In step 416, the VMM returns execution control to application 134. If, for example, the state changing event handled by the VMM was originally a page fault during the recording session, application 134 is now able to execute the memory read instruction having the appropriate page and address accessible in virtual RAM (i.e., without generating a page fault). Similarly, if the state changing event handled by the VMM was a system call during the recording session, application 134 is able to access a register value that would have been produced had such a system call been executed.

It should be recognized that alternative embodiments may utilize other techniques of transferring control from application 134 to the VMM to handle state changing synchronous events that are generated within the execution stream of application's 134 process, such as page faults and system calls. For example, rather than utilizing an asynchronous event delivery mechanism to transfer execution control to the VMM for both synchronous and asynchronous events occurring during the recording session, the VMM can alternatively trap a synchronous event such as a page fault or system call by intercepting a context switch to a fictive guest operating system (i.e., fictive because it does not exist in the replay environment) to gain control.

E. Additional Embodiments

It should be recognized that the techniques described in FIGS. 3 and 4 for recording and replaying a single target application process can be extended to recording and replaying the execution behavior of any group of multiple processes, including, without limitation, the guest operating system itself. In contrast to a traditional deterministic virtual machine record and replay which requires a snapshot of the complete virtual machine state, including the entire disk, memory and device state, the techniques herein take a snapshot of the memory currently in the address spaces of the selected processes at the time the recording was initiated (i.e., contents of the initial snapshot) and then record additional changes to the pages of the address spaces that occur during the recorded session into the log file (as a result of handling page faults, system calls, interrupts, etc.). The state of the devices (e.g., hard drive, etc.) and other parts of RAM that are not part of the initial address spaces of the selected processes or that have not been read or otherwise accessed through page faults, system calls, interrupts, etc. during the course of the recorded session are not stored thereby reducing the amount of data needed to be recorded to perform a replay.

Figure 5:
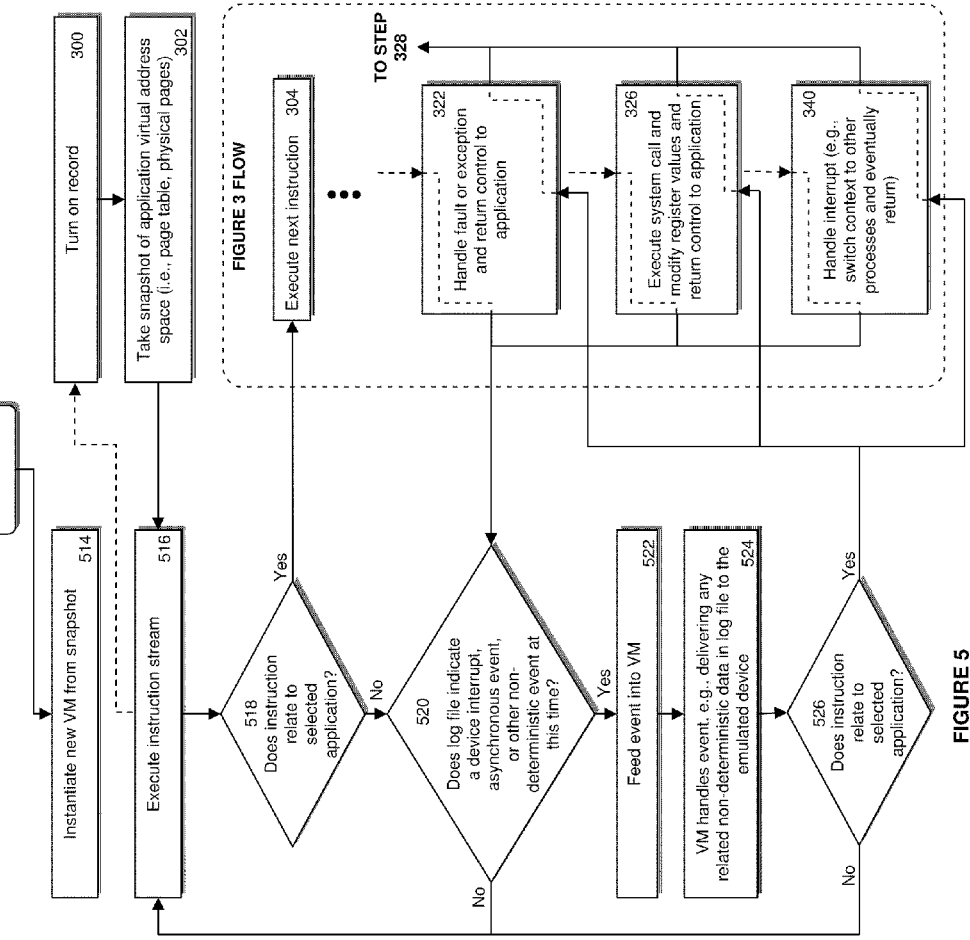
FIG. 5 is a flow for recording the execution behavior of a selected application process during a traditional virtual machine replay.

It should also be recognized that the recording techniques of FIG. 3 may be conducted on a platform running a "live" system or may be performed offline at a later point in time. Offline embodiments can eliminate processing overhead that may be added to a live system if the techniques of FIG. 3 are implemented on the live system itself. FIG. 5 is a flow of an offline embodiment in which the techniques of FIG. 3 are implemented during a traditional virtual machine replay of a session recorded from a virtual machine running a live system. During a traditional virtual machine record session, the VMM of the virtual machine monitors and records non-deterministic events that occur at a level lower than the application level. One example of such non-deterministic events are reads occurring at the virtual device level (e.g., incoming network data, keyboard or mouse inputs, etc.). In step 502, a traditional virtual machine record functionality is enabled on a virtual machine 500 running a live system. In step 504, a snapshot of the complete virtual machine state is created, including the entire disk, memory and device state. In step 506, the recording function tracks the execution behavior of the virtual machine and in step 508, if a non-deterministic event such as a device interrupt or other asynchronous event occurs, the event and related data are recorded into a log file in step 510. One example of a deterministic virtual machine record and replay capability is described in U.S. patent application Ser. No. 12/057,282, entitled "Using Branch Instruction Counts to Facilitate Replay of Virtual Machine Instruction Execution," filed on Mar. 27, 2008, which is hereby incorporated by reference. One example of a virtual machine platform having record and replay capabilities is VMware Workstation 6.

Once a particular process (or processes) has been selected for recording, a new replay virtual machine 512 is instantiated in step 514 by loading the snapshot taken in step 504 and a replay of virtual machine 500 begins in step 516 by starting execution of the instruction stream. Once the instruction stream has reached a point where recording of the selected process is desired, the recording functionality is enabled in step 300 and a snapshot of the address space of the process is taken in step 302 (as in FIG. 3). It should be recognized that, in certain embodiments, the snapshot of step 302 may by created by pruning the complete snapshot taken in step 502, leaving only those portions of memory that were in the address space of the selected process. In step 518, if the instruction in the instruction stream relates to the selected process, the flow enters into the steps of FIG. 3 starting with step 304 in order to record any changes to the address space of the process. During execution of the flow of FIG. 3, if the guest operating system handles a fault or exception, system call or interrupt in steps 322, 326 and 340 respectively, the flow returns to step 520 to check whether the log indicates that a non-deterministic event occurred in the original execution behavior of virtual machine 500 during the handling of such page fault, system call or interrupt. If a non-deterministic event did occur, it is fed into the virtual machine in step 522 so that replay virtual machine 512 can handle the non-deterministic event in step 524, for example, by delivering any data relating to the non-deterministic event (e.g., incoming network data, keyboard events, mouse events, etc.) recorded in the log file to the appropriate virtual device. In step 526, if the instruction relates to the selected process, the flow returns back to FIG. 3 so that the VMM can intercept the context switch from the guest operating system to the application in step 328 and proceed to record any changes made to the state of the process in step 330.

It should also be recognized that the techniques herein may also be performed on non-virtualized computer systems. For example, a kernel module in a traditional operating system (rather than a VMM) may perform the recording steps of FIG. 3 for later replay. The replay of the process as described in FIG. 4 may then be performed through binary translation on a non-virtualized computer system. It should be further recognized that alternative embodiments can be further optimized by monitoring changes to a process's address space at a granularity lower than memory pages. For example, in one embodiment, only data in a particular address that was read during an instruction is saved in the log file in step 330 (as opposed to the entire page that includes the address) and during replay, only the particular address is added into the address space in step 410. Similarly, an embodiment implemented on a system utilizing demand paging to load an application's address space can further reduce the size of the initial snapshot taken in step 302

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for recording an application process running in a virtual machine for replay, the method comprising:
   storing data from one or more virtual hardware resources of the virtual machine, the data being representative of an initial state of the application process;
   monitoring, by operation of a virtual machine monitor of a virtualization layer residing below the virtual machine, switching of execution control between the application process and a guest operating system residing in the virtual machine; and
   logging, by operation of the virtual machine monitor, changes from the initial state of the application process in response to switching of execution control between the application process and the guest operating system, wherein the changes comprise changes to contents of memory belonging to a virtual address space of the application process.

2. The method of claim 1, wherein said monitoring includes:
   intercepting a switch of execution control to the operating system; and intercepting a switch of execution control to the application process.

3. The method of claim 1, wherein the switching of execution control includes a switch of execution control to the operating system and a subsequent switch of execution control back to the application process.

4. The method of claim 1, wherein the stored data representative of the initial state comprises a snapshot of an address space of the application process.

5. The method of claim 4, wherein the stored data representative of the initial state further comprises a snapshot of a set of registers used by the application process.

6. The method of claim 1, further comprising:
determining changes from the initial state by placing a trace on a page table of the application process when there is a switch of execution control to the operating system.

7. The method of claim 1, further comprising the step of taking an initial snapshot of the application process, wherein the initial snapshot comprises a page table of the application process, a set of page frames in a RAM accessible through the page table, and a set of registers used by the application process.

8. The method of claim 1, wherein the switching of execution control occurs as a result of an occurrence of an event selected from the group consisting of faults and exceptions, system calls and interrupts.

9. The method of claim 1, wherein the virtual machine is replaying an execution stream of a second virtual machine.

10. A method for replaying an application process, the method comprising:
loading data representative of an initial state of the application process into one or more virtual hardware resources of a virtual machine; and
replaying the application process, wherein during said replaying, execution control is obtained by a virtual machine monitor of a virtualization layer residing below the virtual machine in accordance with stored data representative of changes to be made to the initial state of the application process, and a virtual address space of the application process within the virtual hardware resources is updated using the stored data upon obtaining execution control, wherein the stored data comprises changes to contents of memory belonging to the virtual address space of the application process.

11. The method of claim 10, further comprising:
during said replaying, delivering an asynchronous event to the application process to obtain execution control.

12. The method of claim 10, wherein the stored data includes entries each reflecting a difference between two states of the application process at different points of switching execution control between the application process and an operating system during a previous session recording the execution of the application process.

13. The method of claim 12, wherein each entry reflects a difference between a first state of the application process when there was a switch of execution control to the operating system during the previous recording session and a second state of the application process when there was a subsequent switch of execution control back to the application process during the previous recording session.

14. The method of claim 10, wherein data loaded into the virtual machine does not include an address space of an operating system.

15. A non-transitory computer readable storage medium having stored therein a computer program for recording an application process running in a virtual machine, wherein a computer system executing the computer program carries out the steps of:
storing data from one or more virtual hardware resources of the virtual machine, the data being representative of an initial state of the application process;
monitoring, by operation of a virtual machine monitor of a virtualization layer residing below the virtual machine, switching of execution control between the application process and a guest operating system residing in the virtual machine; and
logging, by operation of the virtual machine monitor, changes from the initial state of the application process in response to switching of execution control between the application process and the guest operating system, wherein the changes comprise changes to contents of memory belonging to a virtual address space of the application process.

16. The non-transitory computer readable storage medium of claim 15, wherein the switching of execution control includes a switch of execution control to the operating system and a subsequent switch of execution control back to the application process.

17. The non-transitory computer readable storage medium of claim 15, wherein the computer system executing the computer program further carries out the step of:
determining changes from the initial state by placing a trace on a page table of the application process when there is a switch of execution control to the operating system.

18. The non-transitory computer readable storage medium of claim 15, wherein the computer system executing the computer program further carries out the step of taking an initial snapshot of the application process, wherein the initial snapshot comprises a page table of the application process, a set of page frames in a RAM accessible through the page table, and a set of registers used by the application process.

19. A non-transitory computer readable storage medium having stored therein a computer program for replaying an application process, wherein a computer system executing the computer program carries out the steps of:
loading data representative of an initial state of the application process into one or more virtual hardware resources of a virtual machine; and
replaying the application process, wherein during said replaying, execution control is obtained by a virtual machine monitor of a virtualization layer residing below the virtual machine in accordance with stored data representative of changes to be made to the initial state of the application process, and a virtual address space of the application process within the virtual hardware resources is updated using the stored data upon obtaining execution control, wherein the stored data comprises changes to contents of memory belonging to the virtual address space of the application process.

20. The non-transitory computer readable storage medium of claim 19, wherein the stored data includes entries each reflecting a difference between two states of the application process at different points of switching execution control between the application process and an operating system during a previous session recording the execution of the application process.

* * * * *